(12) United States Patent
Tai et al.

(10) Patent No.: US 6,526,823 B2
(45) Date of Patent: Mar. 4, 2003

(54) MICROELECTROMECHANICAL SYSTEM SENSOR ASSEMBLY

(75) Inventors: Yu-Chong Tai, Pasadena, CA (US); Qiao Lin, Pasadena, CA (US); Shuyun Wu, Arcadia, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/727,017

(22) Filed: Nov. 29, 2000

(65) Prior Publication Data

US 2001/0029781 A1 Oct. 18, 2001

Related U.S. Application Data

(60) Provisional application No. 60/168,261, filed on Nov. 30, 1999.

(51) Int. Cl.[7] .................................................. G01F 1/68
(52) U.S. Cl. ................................................... 73/204.26
(58) Field of Search ........................ 73/204.26, 204.15, 73/204.22, 204.23, 204.25

(56) References Cited

U.S. PATENT DOCUMENTS

| | | |
|---|---|---|
| 4,542,650 A | 9/1985 | Renken et al. |
| 4,548,078 A | 10/1985 | Bohrer et al. |
| 5,353,638 A | 10/1994 | Marek |
| 5,533,412 A * | 7/1996 | Jerman et al. ........... 73/861.95 |
| 5,553,497 A | 9/1996 | Doi et al. |
| 5,755,408 A | 5/1998 | Schmidt et al. .............. 244/204 |
| 5,990,473 A | 11/1999 | Dickey et al. ......... 250/231.13 |
| 6,143,583 A | 11/2000 | Hays ........................... 438/39 |

* cited by examiner

Primary Examiner—Benjamin R. Fuller
Assistant Examiner—Jewel V. Thompson
(74) Attorney, Agent, or Firm—Fish & Richardson P.C.

(57) ABSTRACT

A sensor assembly has a substrate with a microchannel formed therein through which a fluid can flow. At least one sensor is proximate to the microchannel. The temperature of the at least one sensor or fluid may indicate the condition of the fluid, for example, the flow rate and the presence of gas bubbles and particulate substances.

28 Claims, 4 Drawing Sheets

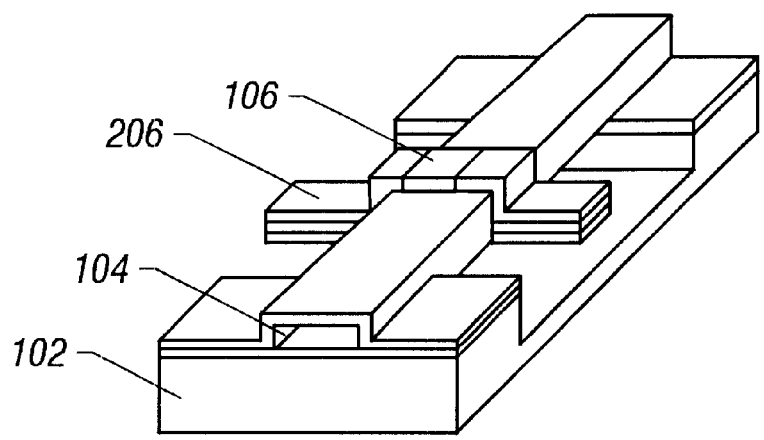
FIG. 4
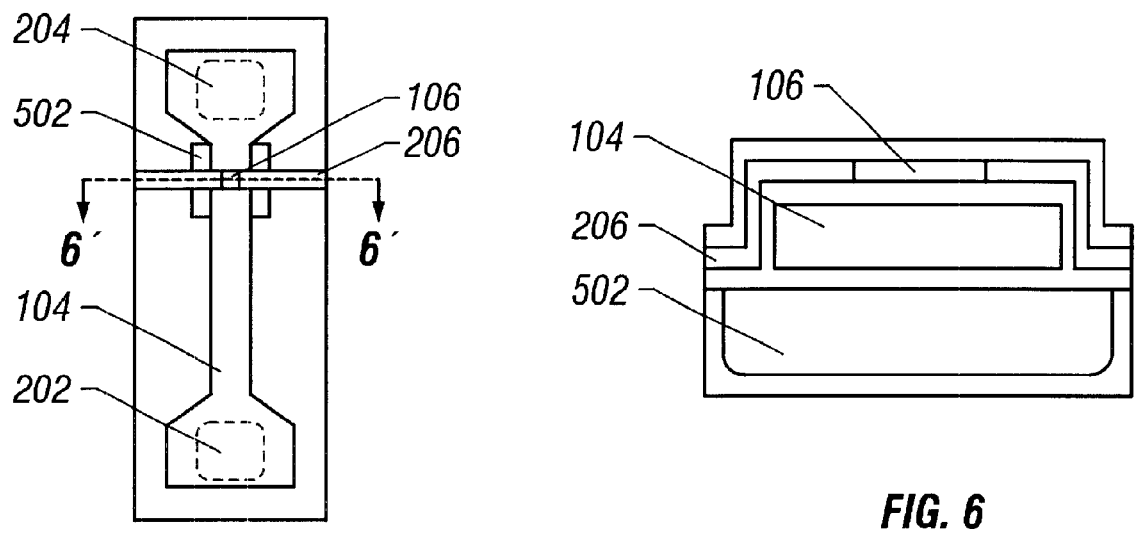
FIG. 5
FIG. 6

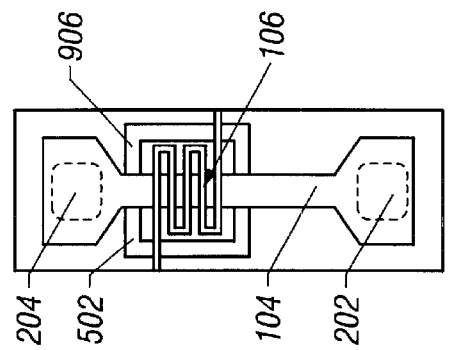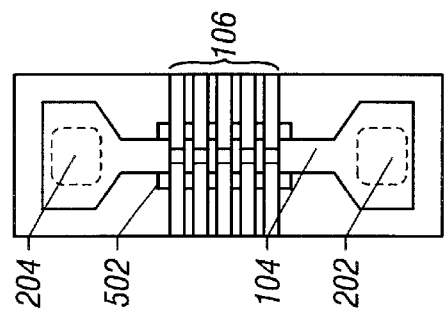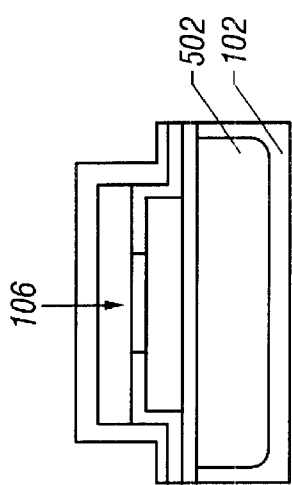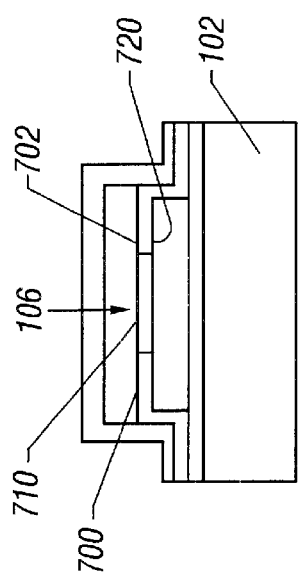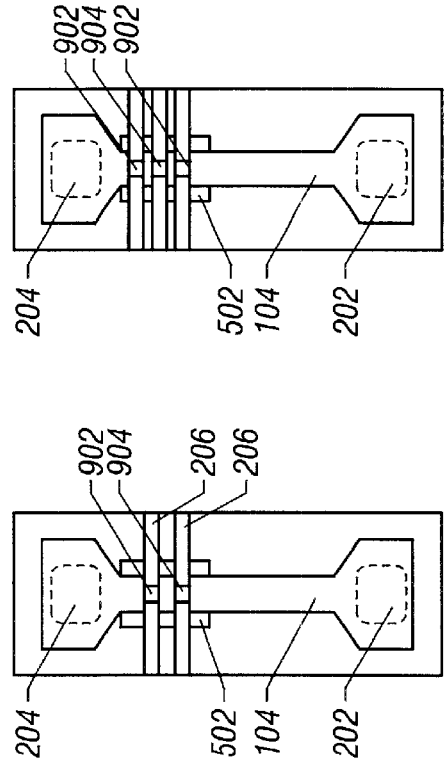

US 6,526,823 B2

MICROELECTROMECHANICAL SYSTEM SENSOR ASSEMBLY

CROSS REFERENCE TO RELATED APPLICATIONS

The present application claims the benefit of U.S. Provisional Application Patent No. 60/168,261 filed Nov. 30, 1999.

STATEMENT REGARDING FEDERALLY SPONSORED RESEARCH

The U.S. Government may have certain rights in this invention pursuant to Grant No. AFOSR 49620-96-1-0376 sponsored by the Microsystems Technology Office of Defense Advanced Research Projects Agency and the Air Force Office of Scientific Research.

BACKGROUND

1. Field

The subject matter described herein relates generally to the field of microelecromechanical systems (MEMS) and, more particularly, to a MEMS sensor assembly.

2. Background Information

MEMS technology makes microfluidic systems attractive for many applications, such as, microchromatographs, biochemical detectors, micromass spectrometers, and microreactors. Precise control of fluid flow, which is important to such microfluidic applications, may be difficult to achieve by typical commercial flow sensors because of their sensitivities. In addition, the commercial sensors are typically not well suited for such applications because of their large size and difficulty in interfacing with microfluidic systems. Furthermore, the high dead volume of typical commercial flow sensors may be undesirable considering the extremely small sampling size in microfluidic applications.

Thus, measurement of minute flow rates and detection of gas bubbles and particulate substances in microfluidic systems may be desirable.

SUMMARY

MEMS sensor assemblies may measure minute flow rates and detect gas bubbles and particulate substances in the flow. The basic operational principle of the flow sensor assemblies utilizes the microconvective heat transfer that occurs to a fluid flow inside a microchannel.

In a particular configuration of a sensor assembly, the sensor assembly comprises a substrate, a microchannel formed on the substrate through which the fluid can flow, and at least one sensor proximate to the microchannel. The temperature of the at least one sensor may indicate the condition of the fluid.

DESCRIPTION OF DRAWINGS

FIG. 4 is an isometric view of another configuration of a sensor assembly.

FIG. 5 is a top view of the sensor assembly shown in FIG. 4.

FIG. 6 is a cross section view of the sensor assembly shown in FIG. 4 taken along the line 6'—6'.

FIG. 7 is a cross section view of another configuration of a sensor assembly.

FIG. 8 is a cross section view of another configuration of a sensor assembly.

FIG. 9 is a top view of a configuration of sensors on a sensor assembly.

FIG. 10 is a top view of another configuration of sensors on a sensor assembly.

FIG. 11 is a top view of another configuration of sensors on a sensor assembly.

FIG. 12 is a top view of another configuration of sensors on a sensor assembly.

Like reference symbols in the various drawings indicate like elements.

DETAILED DESCRIPTION

MEMS sensor assemblies are disclosed herein. Particular embodiments of the sensor assemblies may indicate the condition of a fluid, for example, the flow rate and the presence of gas bubbles and particulate substances in the flow. The basic operational principle of the sensor assemblies utilizes the microconvective heat transfer that occurs to a fluid flow inside a microchannel.

The sensor assemblies may comprise sensors integrated with a micromachined channel. A sensing mechanism is based on microthermal heat transfer to the liquid flow as well as bubbly or particulate substances in the flow. A flow rate resolution may be 10 nL/min.

Further, the sensor assembly can detect microbubbles and particulate substances in the microchannel flow as they move past the sensor, taking advantage of different thermal properties of the liquid and gas bubbles or particulate substances.

Furthermore, the easy integration of the MEMS sensor assemblies within microfluidic systems reduces complicated fluidic interfacing, allowing high yield and reliability.

MEMS batch fabrication of the sensor assemblies may also improve uniformity and reduce cost.

Figure 1:
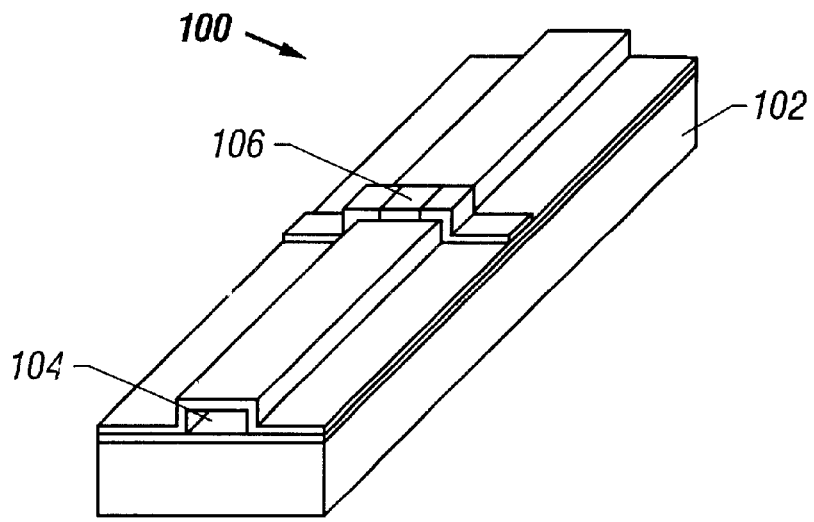
FIG. 1 is an isometric view of a configuration of a sensor assembly.
Figure 2:
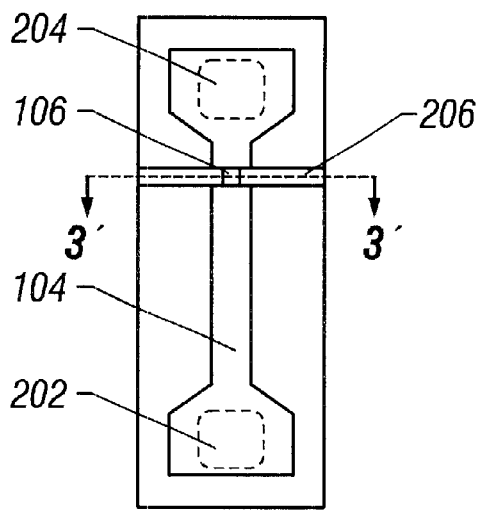
FIG. 2 is a top view of the sensor assembly shown in FIG. 1.
Figure 3:
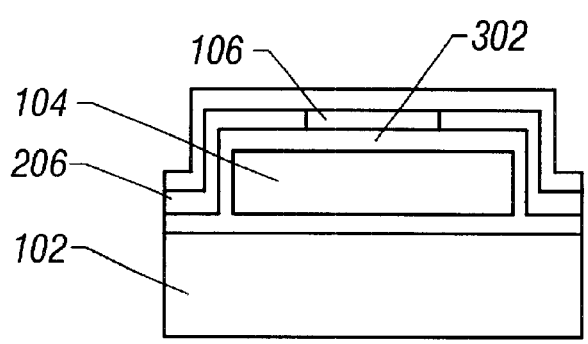
FIG. 3 is a cross section view of the sensor assembly shown in FIG. 1 taken along the line 3'—3'.
Figure 13A:
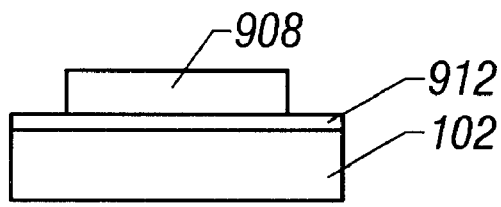
FIGS. 13(a) through (d) illustrate a process of fabricating the sensor assembly shown in FIG. 4.
Figure 13B:
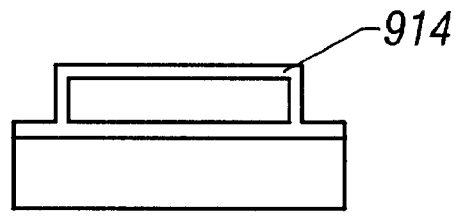
Figure 13C:
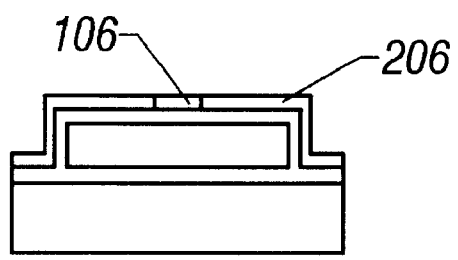
Figure 13D:
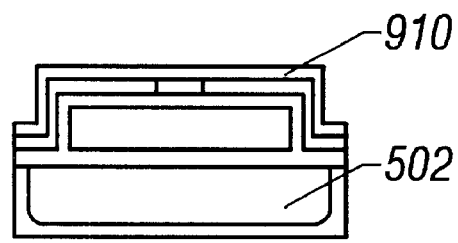

FIGS. 1–3 illustrate a configuration of a particular sensor assembly 100. A substrate 102 is formed with a microchannel 104. The microchannel can comprise silicon nitride formed on the substrate using chip-bonding techniques or surface micromachining technology. Fluid flows between walls of the microchannel, through the microchannel from an inlet 202 to an outlet 204, to at least one sensor 106 that is proximate to the microchannel.

The sensor 106 can be disposed adjacent the microchannel 104, for example, formed on a wall 302 of the microchannel distal to substrate 102. The sensor may be, for example, an electrically heated, single polysilicon thin-film resistor. The polysilicon can be boron-doped to increase the sensor's temperature coefficient of resistance within tolerable noise limits. The sensor can have polysilicon leads 206 to couple a power source to the sensor.

The amount of cooling of the heated sensor, and hence the temperature of the sensor, may be an indicator of the condition of the fluid. The temperature of the sensor changes with the flow rate of the fluid in the microchannel 104 and also with the presence of gas bubbles and particulate substances in the fluid. For example, because air has a lower heat capacity and conductivity than water, the sensor will experience a sudden temperature rise in the presence of air bubbles. Thus, by measuring the sensor temperature, the liquid flow rate can be measured and the presence of gas bubbles and particulate substances can be detected.

Conventional processing circuits and computational techniques can measure the temperature of the sensor and calculate the flow of the fluid and the presence of bubbles and substances.

Insulation of the heated sensor from the substrate 102 may influence the sensitivity of the sensor 106. FIGS. 4–6 illustrate another configuration of the sensor assembly that may improve the sensor's sensitivity. For better thermal isolation, a cavity 502 can be formed in the substrate 102, in the vicinity of the sensor and adjacent the microchannel 104, by removing a portion of the substrate that lies underneath the sensor using, for example, bromium trifluoride ($BrF_3$) dry etching. To reduce the effect of channel wall deflection, the sensor can be located close to the channel outlet.

FIG. 7 illustrates another configuration of the sensor assembly that may improve the sensitivity of the sensor 106. The sensor is suspended in the microchannel 104, within the flow. Two arms 700, 702 hold the sensor within the flow. The top 710 and the bottom 720 of the sensor are therefore exposed to the flow.

FIG. 8 illustrates a configuration that combines both approaches in FIGS. 6 and 7; specifically, both the cavity and the exposed top and bottom surfaces of the sensor.

Other sensors and configurations may be employed in the sensor assemblies. For example, while a single polysilicon resistor can be used for both heating and temperature sensing, the sensor may comprise a temperature-sensing element 902 and a heating element 904 separate from the temperature-sensing element, as shown in FIG. 9. This configuration provides independent control of the doping concentrations of the temperature-sensing element and the heating element. The temperature-sensing element can be made highly sensitive to temperature variations to improve the flow measurement sensitivity. The heating element can be made temperature-insensitive so that the applied power is independent of temperature. This simplifies the operation analysis of the flow sensor. The distance between the heating element and the temperature-sensing element can be varied to further improve operation characteristics. By impulsive heating of the heating element and measuring the transient response of the temperature-sensing element, the flow can be measured without continuously heating up the flow.

FIG. 10 shows a sensor configuration with one heating element 904 and two temperature-sensing elements 902 disposed on one side of the heating element downstream of the fluid flow and on the other side of the heater upstream of the fluid flow. The sensitivity can be improved by applying differential amplification of the signals from the two temperature-sensing elements. This configuration also allows the detection of flow direction by sensing the temperature to undergo opposite changes upstream and downstream of the heater.

FIG. 11 shows a configuration with multiple sensors 106 along the microchannel 104. Different flow rates cause the temperature variation relative to the stagnant flow condition to occur at different locations along the microchannel. This configuration offers improved flow rate measurement resolution.

FIG. 12 shows a configuration with a sensor 106 made of low-resistivity materials. Such materials, for example, heavily doped polysilicon, generally exhibit much less drift compared with high-resistivity materials. Sensitivity may be improved by patterning the sensor in such a way that its length is maximized and its cross section minimized. In this configuration, the temperature-sensing elements and heating elements have a serpentine shape. Such a structure may be fragile. Support for the elements may include a plate 906 underneath the microchannel 104 and the sensor. The sensor may be provided on the wall of the microchannel opposite the substrate. The microchannel may be located between the sensor and the supporting plate.

The sensor assembly can be easily integrated into microfluidic systems. FIGS. 13(a) through (d) show a process of fabricating a sensor on the wall of a microchannel. Starting with a bare silicon wafer 102, a layer 912 of microchannel wall material, for example, 1 $\mu$m thick silicon nitride, is deposited onto the silicon wafer. (FIG. 13(a)). A sacrificial layer 908, for example 2 $\mu$m thick phosphosilicate glass (PSG), can be deposited on layer 912 (FIG. 13(a)). The sacrificial layer can be patterned to define the microchannel geometry. A top layer 914 of microchannel material, for example, 6 $\mu$m thick silicon nitride, can be deposited on the sacrificial layer as the top wall of the microchannel. (FIG. 13(b)). The sacrificial layer can be etched away using, for example, hydrofluoric acid, to form a microchannel. A layer sensor material 106, 206, for example, 0.5 $\mu$m thick polycrystalline silicon, can be deposited on the top layer. (FIG. 13(c)). The polysilicon can be doped by $B^+$ ion implantation, and followed by annealing at 1000° Celsius for 30 minutes. The layer sensor material can be formed and patterned by, for example, by plasma dry etching, to define sensor geometry. The sensor 106 with leads 206 can be sealed by uniformly depositing a layer of passivation material 910, for example, 0.6 $\mu$m thick silicon nitride. (FIG. 13(d)). The inlet and outlet can be opened using, for example, potassium hydroxide. Contact hole opening and metallization, for example, aluminum, forms connections to the sensor. Finally, the microchannel can be thermally isolated by isotropically bulk etching the silicon underneath the microchannel to form cavity 502.

A microchannel with a suspended sensor inside the microchannel can be fabricated similarly using the above process except that the sensor material is deposited prior to the completion of the microchannel formation. The microchannel can be suspended from the substrate using $BrF_3$ undercutting of silicon.

The dimensions of the microchannel may vary, and channels having dimensions of 2000×20×2 $\mu m^3$ have been fabricated. Polysilicon sensors have been fabricated having a uniform boron concentration of $2 \times 10^{19}$ cm$^{-3}$ and, in certain areas of the sensor, with a reduced doping concentration of $2 \times 10^{18}$ cm$^{-3}$. FIG. 3 shows the reduced doping region extending over a portion of the channel's traverse direction, for example, approximately 10 $\mu$m. In FIG. 6, although not shown, the lightly doped region can extend the channel's entire traverse direction, for example, approximately 20 $\mu$m.

In conclusion, sensor assemblies described herein can be interfaced with microfluidic systems, allow measurement of minute flow rates, and detect gas bubbles and particulate substances in microfluidic systems.

With the benefit of this disclosure, those skilled in the art may recognize that other modifications and variations may be made in the line of the present invention and in construction and operation of this sensor assembly without departing from the scope or spirit of this invention.

A number of embodiments of the invention have been described. Nevertheless, it may be understood that various modifications may be made without departing from the spirit and scope of the invention. Accordingly, other embodiments are within the scope of the following claims.

What is claimed is:

1. A temperature sensor, comprising:
   a substrate formed of a semiconductor material;
   a channel, formed of a different material than said substrate, formed over said substrate, and having interior walls defining a channel area through which a fluid can flow;
   a sensor element, thermally coupled to said channel area, including a heating element, and a part that detects an amount a cooling of the heating element, said sensor including electrical leads operating to couple power to the sensor.

2. A temperature sensor as in claim 1, wherein said sensor includes an electrically heated polysilicon thin film resistor.

3. A temperature sensor as in claim 2, wherein said polysilicon thin film resistor is doped with boron.

4. A temperature sensor as in claim 1, further comprising an insulating element which insulates the sensor from the substrate.

5. A temperature sensor as in claim 4, wherein said insulating element comprises removed portions of the substrate.

6. A temperature sensor as in claim 1, wherein said sensor element is located coupled to one of said walls.

7. A temperature sensor as in claim 1, wherein said sensor element is located suspended within the channel area.

8. A temperature sensor as in claim 1, wherein said sensor element includes a separate heating element and separate temperature sensing element.

9. A temperature sensor as in claim 8, wherein a doping concentration of the temperature sensing element is different than a doping concentration of the heating element.

10. A temperature sensor as in claim 8, wherein there are multiple temperature sensing elements, and further comprising a differential amplification element which differentially amplifies signals from the multiple temperature sensing elements.

11. A temperature sensor as in claim 1, wherein said sensor element includes a separate heating element and temperature sensing element, and wherein said heating element and temperature sensing element have separate doping levels.

12. A temperature sensor as in claim 1, wherein said substrate is formed of silicon, and walls of said channel are formed of silicon nitride.

13. A temperature sensor as in claim 1, wherein said electrical leads are formed of polysilicon.

14. A method of sensing temperature in a fluid, comprising:
   flowing the fluid through a channel which is formed on a semiconductor substrate;
   heating a heating element while fluid is flowing through the channel; and
   sensing an effect of the fluid flow on the heating element to detect flow rate of fluid, presence of gas bubbles and presence of particulate substances in the fluid.

15. A method as in claim 14, wherein said sensing gas bubbles comprises sensing a sudden temperature rise.

16. A method as in claim 14, further comprising doping a sensor element to change a temperature coefficient of resistance, for noise reduction.

17. A method as in claim 14, further comprising insulating between the sensor and the substrate, to improve sensitivity of the sensor.

18. A method as in claim 17, wherein said insulating comprises removing a portion of substrate under the sensor.

19. A method as in claim 14, further comprising separately optimizing the heating element and a sensing element.

20. A method as in claim 19, wherein said separately optimizing comprises independently changing doping levels of the heating element and the sensing element.

21. A method as in claim 19, wherein said separately optimizing comprises making the heating element temperature insensitive.

22. A method as in claim 14, further comprising impulsively heating the heating element to minimize heating of the flow.

23. A method as in claim 22, further comprising measuring a transient response of the temperature sensing element.

24. A method as in claim 14, wherein said sensing comprises sensing in multiple sensors and differentially amplifying the sensing in the multiple sensors.

25. A method as in claim 14, wherein said sensing comprises sensing in multiple sensors at different locations.

26. A method as in claim 14, wherein said sensing comprises sensing in a sensor which has three surfaces exposed to said fluid.

27. A method as in claim 14, further comprising suspending the sensor within the fluid flow.

28. A method as in claim 14, wherein said flowing comprises flowing the fluid through a channel which is on top of the substrate and formed of a different material than the substrate.

* * * * *